(12) United States Patent
Gardner

(10) Patent No.: US 8,276,816 B2
(45) Date of Patent: Oct. 2, 2012

(54) SMART CARD SYSTEM WITH ERGONOMIC FINGERPRINT SENSOR AND METHOD OF USING

(75) Inventor: Lawrence C. Gardner, San Jose, CA (US)

(73) Assignee: Validity Sensors, Inc., San Jose, CA (US)

( * ) Notice: Subject to any disclaimer, the term of this patent is extended or adjusted under 35 U.S.C. 154(b) by 278 days.

(21) Appl. No.: 11/957,353

(22) Filed: Dec. 14, 2007

(65) Prior Publication Data

US 2009/0153297 A1    Jun. 18, 2009

(51) Int. Cl.
*G06K 7/00* (2006.01)
*G06K 7/08* (2006.01)
*G06K 9/00* (2006.01)

(52) U.S. Cl. ........ 235/440; 235/380; 235/451; 235/492; 382/115; 382/124

(58) Field of Classification Search .................. 235/375, 235/380, 382–382.5, 451, 492, 493, 449, 235/487, 494, 440; 382/115, 124–128
See application file for complete search history.

(56) References Cited

U.S. PATENT DOCUMENTS

| 4,151,512 A | 4/1979 | Rigannati et al. |
| 4,225,850 A | 9/1980 | Chang et al. |
| 4,310,827 A | 1/1982 | Asi |
| 4,353,056 A | 10/1982 | Tsikos |
| 4,405,829 A | 9/1983 | Rivest et al. |
| 4,525,859 A | 6/1985 | Bowles et al. |
| 4,550,221 A | 10/1985 | Mabusth |
| 4,580,790 A | 4/1986 | Doose |
| 4,582,985 A | 4/1986 | Lofberg |
| 4,758,622 A | 7/1988 | Gosselin |
| 4,817,183 A | 3/1989 | Sparrow |
| 5,076,566 A | 12/1991 | Kriegel |

(Continued)

FOREIGN PATENT DOCUMENTS

DE    2213813 A1    10/1973

(Continued)

OTHER PUBLICATIONS

Matsumoto et al., Impact of Artificial "Gummy" Fingers on Fingerprint System, SPIE 4677 (2002), reprinted from cryptome.org.

(Continued)

*Primary Examiner* — Tuyen K Vo
(74) *Attorney, Agent, or Firm* — Greenberg Traurig LLP; Cecily Anne O'Regan; William C. Cray

(57) ABSTRACT

A unitized smart card device with a partial fingerprint sensor, ergonomic guides and a processor is disclosed. The smart card contains secure memory, battery, and a processor to run the fingerprint sensor. The ergonomic guides help insure that the users finger properly swipes the fingerprint sensor. The smart card be used on a backwards compatible "dumb credit card" basis, or it may dock with an external smart card docking station. This docking station may act to facilitate communication between the smart card's fingerprint sensor and its onboard secure memory; and external computerized devices. The docking station itself may be configured with slots or other openings to allow users to access the smart card's fingerprint sensor while the smart card is docked with the docking station. The docking station itself may contain ergonomic guides to help ensure that the smart card's fingerprint sensor is used (swiped) in a correct manner.

22 Claims, 8 Drawing Sheets

U.S. PATENT DOCUMENTS

| | | |
|---|---|---|
| 5,109,427 A | 4/1992 | Yang |
| 5,140,642 A | 8/1992 | Hsu et al. |
| 5,305,017 A | 4/1994 | Gerpheide |
| 5,319,323 A | 6/1994 | Fong |
| 5,325,442 A | 6/1994 | Knapp |
| 5,420,936 A | 5/1995 | Fitzpatrick et al. |
| 5,422,807 A | 6/1995 | Mitra et al. |
| 5,456,256 A * | 10/1995 | Schneider et al. ............ 600/445 |
| 5,543,591 A | 8/1996 | Gillespie et al. |
| 5,569,901 A | 10/1996 | Bridgelall et al. |
| 5,623,552 A * | 4/1997 | Lane ............................ 382/124 |
| 5,627,316 A | 5/1997 | De Winter et al. |
| 5,650,842 A | 7/1997 | Maase et al. |
| 5,717,777 A | 2/1998 | Wong et al. |
| 5,781,651 A | 7/1998 | Hsiao et al. |
| 5,801,681 A | 9/1998 | Sayag |
| 5,818,956 A | 10/1998 | Tuli |
| 5,838,306 A | 11/1998 | O'Connor |
| 5,848,176 A | 12/1998 | Harra et al. |
| 5,850,450 A | 12/1998 | Schweitzer et al. |
| 5,852,670 A | 12/1998 | Setlak et al. |
| 5,864,296 A | 1/1999 | Upton |
| 5,887,343 A | 3/1999 | Salatino et al. |
| 5,892,824 A | 4/1999 | Beatson et al. |
| 5,903,225 A | 5/1999 | Schmitt et al. |
| 5,915,757 A | 6/1999 | Tsuyama et al. |
| 5,920,384 A | 7/1999 | Borza |
| 5,920,640 A | 7/1999 | Salatino et al. |
| 5,940,526 A | 8/1999 | Setlak et al. |
| 5,963,679 A | 10/1999 | Setlak |
| 5,999,637 A | 12/1999 | Toyoda et al. |
| 6,002,815 A | 12/1999 | Immega et al. |
| 6,016,355 A | 1/2000 | Dickinson et al. |
| 6,052,475 A | 4/2000 | Upton |
| 6,067,368 A | 5/2000 | Setlak et al. |
| 6,073,343 A | 6/2000 | Petrick et al. |
| 6,076,566 A | 6/2000 | Lowe |
| 6,088,585 A | 7/2000 | Schmitt et al. |
| 6,098,175 A | 8/2000 | Lee |
| 6,118,318 A | 9/2000 | Fifield et al. |
| 6,134,340 A | 10/2000 | Hsu et al. |
| 6,157,722 A | 12/2000 | Lerner et al. |
| 6,161,213 A | 12/2000 | Lofstrom |
| 6,175,407 B1 | 1/2001 | Santor |
| 6,182,076 B1 | 1/2001 | Yu et al. |
| 6,182,892 B1 * | 2/2001 | Angelo et al. ................ 235/380 |
| 6,185,318 B1 | 2/2001 | Jain et al. |
| 6,234,031 B1 | 5/2001 | Suga |
| 6,241,288 B1 | 6/2001 | Bergenek et al. |
| 6,259,108 B1 | 7/2001 | Antonelli et al. |
| 6,289,114 B1 | 9/2001 | Mainguet |
| 6,292,272 B1 | 9/2001 | Okauchi et al. |
| 6,317,508 B1 | 11/2001 | Kramer et al. |
| 6,320,394 B1 | 11/2001 | Tartagni |
| 6,325,285 B1 | 12/2001 | Baratelli |
| 6,332,193 B1 | 12/2001 | Glass et al. |
| 6,333,989 B1 | 12/2001 | Borza |
| 6,337,919 B1 | 1/2002 | Dunton |
| 6,346,739 B1 | 2/2002 | Lepert et al. |
| 6,347,040 B1 | 2/2002 | Fries et al. |
| 6,357,663 B1 | 3/2002 | Takahashi et al. |
| 6,360,004 B1 | 3/2002 | Akizuki |
| 6,362,633 B1 | 3/2002 | Tartagni |
| 6,392,636 B1 | 5/2002 | Ferrari et al. |
| 6,399,994 B2 | 6/2002 | Shobu |
| 6,400,836 B2 | 6/2002 | Senior |
| 6,408,087 B1 | 6/2002 | Kramer |
| 6,473,072 B1 | 10/2002 | Comiskey et al. |
| 6,509,501 B2 | 1/2003 | Eicken et al. |
| 6,525,547 B2 | 2/2003 | Hayes |
| 6,525,932 B1 | 2/2003 | Ohnishi et al. |
| 6,539,101 B1 | 3/2003 | Black |
| 6,580,816 B2 | 6/2003 | Kramer et al. |
| 6,597,289 B2 | 7/2003 | Sabatini |
| 6,631,201 B1 | 10/2003 | Dickinson et al. |
| 6,643,389 B1 | 11/2003 | Raynal et al. |
| 6,672,174 B2 | 1/2004 | Deconde et al. |
| 6,710,461 B2 | 3/2004 | Chou et al. |
| 6,738,050 B2 | 5/2004 | Comiskey et al. |
| 6,741,729 B2 | 5/2004 | Bjorn et al. |
| 6,757,002 B1 | 6/2004 | Oross et al. |
| 6,766,040 B1 | 7/2004 | Catalano et al. |
| 6,785,407 B1 | 8/2004 | Tschudi et al. |
| 6,836,230 B2 | 12/2004 | Le Pailleur et al. |
| 6,838,905 B1 | 1/2005 | Doyle |
| 6,873,356 B1 | 3/2005 | Kanbe et al. |
| 6,886,104 B1 | 4/2005 | McClurg et al. |
| 6,897,002 B2 | 5/2005 | Teraoka et al. |
| 6,898,299 B1 | 5/2005 | Brooks |
| 6,924,496 B2 | 8/2005 | Manansala |
| 6,937,748 B1 | 8/2005 | Schneider et al. |
| 6,941,001 B1 | 9/2005 | Bolle et al. |
| 6,941,810 B2 | 9/2005 | Okada |
| 6,950,540 B2 | 9/2005 | Higuchi |
| 6,959,874 B2 * | 11/2005 | Bardwell ....................... 235/493 |
| 6,963,626 B1 | 11/2005 | Shaeffer et al. |
| 6,970,584 B2 | 11/2005 | O'Gorman et al. |
| 6,980,672 B2 | 12/2005 | Saito et al. |
| 6,983,882 B2 * | 1/2006 | Cassone ........................ 235/382 |
| 7,013,030 B2 | 3/2006 | Wong et al. |
| 7,020,591 B1 | 3/2006 | Wei et al. |
| 7,030,860 B1 | 4/2006 | Hsu et al. |
| 7,031,670 B2 | 4/2006 | May |
| 7,035,443 B2 | 4/2006 | Wong |
| 7,042,535 B2 | 5/2006 | Katoh et al. |
| 7,043,061 B2 | 5/2006 | Hamid et al. |
| 7,043,644 B2 | 5/2006 | DeBruine |
| 7,046,230 B2 | 5/2006 | Zadesky et al. |
| 7,064,743 B2 | 6/2006 | Nishikawa |
| 7,099,496 B2 * | 8/2006 | Benkley, III .................. 382/124 |
| 7,110,574 B2 | 9/2006 | Haruki et al. |
| 7,110,577 B1 | 9/2006 | Tschud |
| 7,113,622 B2 | 9/2006 | Hamid |
| 7,126,389 B1 | 10/2006 | McRae et al. |
| 7,129,926 B2 | 10/2006 | Mathiassen et al. |
| 7,136,514 B1 | 11/2006 | Wong |
| 7,146,024 B2 * | 12/2006 | Benkley, III .................. 382/107 |
| 7,146,026 B2 | 12/2006 | Russon et al. |
| 7,146,029 B2 | 12/2006 | Manansala |
| 7,184,581 B2 | 2/2007 | Johansen et al. |
| 7,190,816 B2 | 3/2007 | Mitsuyu et al. |
| 7,194,392 B2 | 3/2007 | Tuken et al. |
| 7,197,168 B2 | 3/2007 | Russo |
| 7,200,250 B2 | 4/2007 | Chou |
| 7,251,351 B2 | 7/2007 | Mathiassen et al. |
| 7,258,279 B2 | 8/2007 | Schneider et al. |
| 7,260,246 B2 | 8/2007 | Fujii |
| 7,263,212 B2 | 8/2007 | Kawabe |
| 7,263,213 B2 | 8/2007 | Rowe |
| 7,289,649 B1 | 10/2007 | Walley et al. |
| 7,290,323 B2 | 11/2007 | Deconde et al. |
| 7,308,121 B2 | 12/2007 | Mathiassen et al. |
| 7,308,122 B2 | 12/2007 | McClurg et al. |
| 7,321,672 B2 * | 1/2008 | Sasaki et al. .................. 382/124 |
| 7,356,169 B2 | 4/2008 | Hamid |
| 7,360,688 B1 | 4/2008 | Harris |
| 7,369,685 B2 | 5/2008 | DeLeon |
| 7,379,569 B2 | 5/2008 | Chikazawa et al. |
| 7,408,135 B2 | 8/2008 | Fujieda |
| 7,409,876 B2 | 8/2008 | Ganapathi et al. |
| 7,412,083 B2 | 8/2008 | Takahashi |
| 7,424,618 B2 | 9/2008 | Roy et al. |
| 7,447,339 B2 | 11/2008 | Mimura et al. |
| 7,447,911 B2 | 11/2008 | Chou et al. |
| 7,460,697 B2 | 12/2008 | Erhart et al. |
| 7,463,756 B2 | 12/2008 | Benkley |
| 7,505,611 B2 | 3/2009 | Fyke |
| 7,505,613 B2 | 3/2009 | Russo |
| 7,565,548 B2 | 7/2009 | Fiske et al. |
| 7,574,022 B2 | 8/2009 | Russo |
| 7,596,832 B2 | 10/2009 | Hsieh et al. |
| 7,643,950 B1 | 1/2010 | Getzin et al. |
| 7,646,897 B2 | 1/2010 | Fyke |
| 7,681,232 B2 | 3/2010 | Nordentoft et al. |
| 7,689,013 B2 | 3/2010 | Shinzaki |
| 7,706,581 B2 | 4/2010 | Drews et al. |
| 7,733,697 B2 | 6/2010 | Picca et al. |

| | | |
|---|---|---|
| 7,751,601 B2 | 7/2010 | Benkley |
| 7,843,438 B2 | 11/2010 | Onoda |
| 7,848,798 B2 | 12/2010 | Martinsen et al. |
| 7,899,216 B2 | 3/2011 | Watanabe et al. |
| 7,953,258 B2 | 5/2011 | Dean et al. |
| 7,953,259 B2 | 5/2011 | McClurg |
| 8,005,276 B2 | 8/2011 | Dean et al. |
| 8,031,916 B2 | 10/2011 | Abiko et al. |
| 8,077,935 B2 | 12/2011 | Geoffroy et al. |
| 8,107,212 B2 | 1/2012 | Nelson et al. |
| 8,116,540 B2 | 2/2012 | Dean et al. |
| 8,131,026 B2 | 3/2012 | Benkley et al. |
| 8,165,355 B2 | 4/2012 | Benkley et al. |
| 8,175,345 B2 | 5/2012 | Gardner |
| 8,204,281 B2 | 6/2012 | Satya et al. |
| 2001/0026636 A1 | 10/2001 | Mainget |
| 2001/0030644 A1 | 10/2001 | Allport |
| 2001/0036299 A1 | 11/2001 | Senior |
| 2001/0043728 A1 | 11/2001 | Kramer et al. |
| 2002/0025062 A1 | 2/2002 | Black |
| 2002/0061125 A1 | 5/2002 | Fujii |
| 2002/0064892 A1 | 5/2002 | Lepert et al. |
| 2002/0067845 A1 | 6/2002 | Griffis |
| 2002/0073046 A1 | 6/2002 | David |
| 2002/0089044 A1 | 7/2002 | Simmons et al. |
| 2002/0089410 A1 | 7/2002 | Janiak et al. |
| 2002/0096731 A1 | 7/2002 | Wu et al. |
| 2002/0122026 A1 | 9/2002 | Bergstrom |
| 2002/0126516 A1 | 9/2002 | Jeon |
| 2002/0133725 A1 | 9/2002 | Roy et al. |
| 2002/0152048 A1 | 10/2002 | Hayes |
| 2002/0181749 A1 | 12/2002 | Matsumoto et al. |
| 2003/0002717 A1 | 1/2003 | Hamid |
| 2003/0002719 A1 | 1/2003 | Hamid et al. |
| 2003/0021495 A1 | 1/2003 | Cheng |
| 2003/0035570 A1 | 2/2003 | Benkley |
| 2003/0063782 A1 | 4/2003 | Acharya et al. |
| 2003/0068072 A1 | 4/2003 | Hamid |
| 2003/0076301 A1 | 4/2003 | Tsuk et al. |
| 2003/0076303 A1 | 4/2003 | Huppi |
| 2003/0095096 A1 | 5/2003 | Robbin et al. |
| 2003/0095690 A1 | 5/2003 | Su et al. |
| 2003/0102874 A1 | 6/2003 | Lane et al. |
| 2003/0123714 A1 | 7/2003 | O'Gorman et al. |
| 2003/0123715 A1 | 7/2003 | Uchida |
| 2003/0141959 A1 | 7/2003 | Keogh et al. |
| 2003/0147015 A1 | 8/2003 | Katoh et al. |
| 2003/0161510 A1 | 8/2003 | Fujii |
| 2003/0161512 A1 | 8/2003 | Mathiassen et al. |
| 2003/0169228 A1 | 9/2003 | Mathiassen et al. |
| 2003/0174871 A1 | 9/2003 | Yoshioka et al. |
| 2003/0186157 A1 | 10/2003 | Teraoka et al. |
| 2003/0209293 A1 | 11/2003 | Sako et al. |
| 2003/0224553 A1 | 12/2003 | Manansala |
| 2004/0012773 A1 | 1/2004 | Puttkammer |
| 2004/0017934 A1 | 1/2004 | Kocher et al. |
| 2004/0022001 A1 | 2/2004 | Chu et al. |
| 2004/0042642 A1 | 3/2004 | Bolle et al. |
| 2004/0050930 A1 | 3/2004 | Rowe |
| 2004/0066613 A1 | 4/2004 | Leitao |
| 2004/0076313 A1 | 4/2004 | Bronstein et al. |
| 2004/0081339 A1 | 4/2004 | Benkley |
| 2004/0096086 A1 | 5/2004 | Miyasaka et al. |
| 2004/0113956 A1 | 6/2004 | Bellwood et al. |
| 2004/0120400 A1 | 6/2004 | Linzer |
| 2004/0125993 A1 | 7/2004 | Zhao et al. |
| 2004/0129787 A1 | 7/2004 | Saito |
| 2004/0136612 A1 | 7/2004 | Meister et al. |
| 2004/0155752 A1 | 8/2004 | Radke |
| 2004/0172339 A1 | 9/2004 | Snelgrove et al. |
| 2004/0179718 A1 | 9/2004 | Chou |
| 2004/0184641 A1 | 9/2004 | Nagasaka et al. |
| 2004/0190761 A1 | 9/2004 | Lee |
| 2004/0208346 A1 | 10/2004 | Baharav et al. |
| 2004/0208347 A1 | 10/2004 | Baharav et al. |
| 2004/0208348 A1 | 10/2004 | Baharav et al. |
| 2004/0213441 A1 | 10/2004 | Tschudi |
| 2004/0215689 A1 | 10/2004 | Dooley et al. |
| 2004/0228505 A1 | 11/2004 | Sugimoto |
| 2004/0228508 A1 | 11/2004 | Shigeta |
| 2004/0240712 A1 | 12/2004 | Rowe et al. |
| 2004/0252867 A1 | 12/2004 | Lan et al. |
| 2005/0031174 A1 | 2/2005 | Ryhanen et al. |
| 2005/0036665 A1 | 2/2005 | Higuchi |
| 2005/0047485 A1 | 3/2005 | Khayrallah et al. |
| 2005/0100196 A1 | 5/2005 | Scott et al. |
| 2005/0100938 A1 | 5/2005 | Hofmann et al. |
| 2005/0109835 A1 | 5/2005 | Jacoby et al. |
| 2005/0110103 A1 | 5/2005 | Setlak |
| 2005/0111708 A1 | 5/2005 | Chou |
| 2005/0123176 A1 | 6/2005 | Ishii et al. |
| 2005/0129291 A1 | 6/2005 | Boshra |
| 2005/0136200 A1 | 6/2005 | Durell et al. |
| 2005/0139656 A1* | 6/2005 | Arnouse .................. 235/382 |
| 2005/0139685 A1* | 6/2005 | Kozlay .................... 235/492 |
| 2005/0162402 A1 | 7/2005 | Watanachote |
| 2005/0169503 A1 | 8/2005 | Howell et al. |
| 2005/0174015 A1 | 8/2005 | Scott et al. |
| 2005/0210271 A1 | 9/2005 | Chou et al. |
| 2005/0219200 A1 | 10/2005 | Weng |
| 2005/0220329 A1 | 10/2005 | Payne et al. |
| 2005/0231213 A1 | 10/2005 | Chou et al. |
| 2005/0238212 A1 | 10/2005 | Du et al. |
| 2005/0244038 A1 | 11/2005 | Benkley |
| 2005/0244039 A1 | 11/2005 | Geoffroy et al. |
| 2005/0247559 A1 | 11/2005 | Frey et al. |
| 2005/0249386 A1 | 11/2005 | Juh |
| 2005/0258952 A1 | 11/2005 | Utter et al. |
| 2005/0269402 A1* | 12/2005 | Spitzer et al. ............ 235/380 |
| 2006/0006224 A1 | 1/2006 | Modi |
| 2006/0055500 A1 | 3/2006 | Burke et al. |
| 2006/0066572 A1 | 3/2006 | Yumoto et al. |
| 2006/0076926 A1 | 4/2006 | Lee |
| 2006/0078176 A1 | 4/2006 | Abiko et al. |
| 2006/0083411 A1 | 4/2006 | Benkley |
| 2006/0110537 A1 | 5/2006 | Huang et al. |
| 2006/0140461 A1 | 6/2006 | Kim et al. |
| 2006/0144953 A1 | 7/2006 | Takao |
| 2006/0170528 A1 | 8/2006 | Funushige et al. |
| 2006/0187200 A1 | 8/2006 | Martin |
| 2006/0210082 A1 | 9/2006 | Devadas et al. |
| 2006/0214512 A1 | 9/2006 | Iwata |
| 2006/0239514 A1 | 10/2006 | Watanabe et al. |
| 2006/0249008 A1 | 11/2006 | Luther |
| 2006/0259873 A1 | 11/2006 | Mister |
| 2006/0261174 A1 | 11/2006 | Zellner et al. |
| 2006/0267385 A1 | 11/2006 | Steenwyk et al. |
| 2006/0271793 A1 | 11/2006 | Devadas et al. |
| 2006/0287963 A1 | 12/2006 | Steeves et al. |
| 2007/0031011 A1 | 2/2007 | Erhart et al. |
| 2007/0036400 A1 | 2/2007 | Watanabe et al. |
| 2007/0057763 A1 | 3/2007 | Blattner et al. |
| 2007/0067828 A1 | 3/2007 | Bychkov |
| 2007/0076926 A1 | 4/2007 | Schneider et al. |
| 2007/0076951 A1 | 4/2007 | Tanaka et al. |
| 2007/0086634 A1 | 4/2007 | Setlak et al. |
| 2007/0090312 A1 | 4/2007 | Stallinga et al. |
| 2007/0138299 A1 | 6/2007 | Mitra |
| 2007/0160269 A1 | 7/2007 | Kuo |
| 2007/0180261 A1 | 8/2007 | Akkermans et al. |
| 2007/0196002 A1 | 8/2007 | Choi et al. |
| 2007/0198141 A1 | 8/2007 | Moore |
| 2007/0198435 A1 | 8/2007 | Siegal et al. |
| 2007/0228154 A1 | 10/2007 | Tran |
| 2007/0237366 A1 | 10/2007 | Maletsky |
| 2007/0248249 A1 | 10/2007 | Stoianov |
| 2008/0002867 A1 | 1/2008 | Mathiassen et al. |
| 2008/0013805 A1 | 1/2008 | Sengupta et al. |
| 2008/0019578 A1 | 1/2008 | Saito et al. |
| 2008/0049987 A1 | 2/2008 | Champagne et al. |
| 2008/0049989 A1 | 2/2008 | Iseri et al. |
| 2008/0063245 A1 | 3/2008 | Benkley et al. |
| 2008/0069412 A1 | 3/2008 | Champagne et al. |
| 2008/0126260 A1 | 5/2008 | Cox et al. |
| 2008/0169345 A1 | 7/2008 | Keane et al. |
| 2008/0170695 A1 | 7/2008 | Adler et al. |
| 2008/0175450 A1 | 7/2008 | Scott et al. |
| 2008/0178008 A1 | 7/2008 | Takahashi et al. |

| | | | |
|---|---|---|---|
| 2008/0179112 A1 | 7/2008 | Qin et al. | |
| 2008/0185429 A1 | 8/2008 | Saville | |
| 2008/0201265 A1* | 8/2008 | Hewton | 705/67 |
| 2008/0205714 A1 | 8/2008 | Benkley et al. | |
| 2008/0219521 A1 | 9/2008 | Benkley et al. | |
| 2008/0222049 A1 | 9/2008 | Loomis et al. | |
| 2008/0223925 A1* | 9/2008 | Saito et al. | 235/380 |
| 2008/0226132 A1 | 9/2008 | Gardner | |
| 2008/0240523 A1 | 10/2008 | Benkley et al. | |
| 2008/0244277 A1 | 10/2008 | Orsini et al. | |
| 2008/0267462 A1 | 10/2008 | Nelson et al. | |
| 2008/0279373 A1 | 11/2008 | Erhart et al. | |
| 2008/0317290 A1 | 12/2008 | Tazoe | |
| 2009/0130369 A1 | 5/2009 | Huang et al. | |
| 2009/0153297 A1 | 6/2009 | Gardner | |
| 2009/0154779 A1 | 6/2009 | Satyan et al. | |
| 2009/0155456 A1 | 6/2009 | Benkley et al. | |
| 2009/0169071 A1 | 7/2009 | Bond et al. | |
| 2009/0174974 A1 | 7/2009 | Huang et al. | |
| 2009/0237135 A1 | 9/2009 | Ramaraju et al. | |
| 2009/0252384 A1 | 10/2009 | Dean et al. | |
| 2009/0252385 A1 | 10/2009 | Dean et al. | |
| 2009/0252386 A1 | 10/2009 | Dean et al. | |
| 2009/0279742 A1 | 11/2009 | Abiko | |
| 2009/0319435 A1 | 12/2009 | Little et al. | |
| 2009/0324028 A1 | 12/2009 | Russo | |
| 2010/0026451 A1 | 2/2010 | Erhart et al. | |
| 2010/0045705 A1 | 2/2010 | Vertegaal et al. | |
| 2010/0083000 A1 | 4/2010 | Kesanupalli et al. | |
| 2010/0119124 A1 | 5/2010 | Satyan | |
| 2010/0123675 A1 | 5/2010 | Ippel | |
| 2010/0127366 A1 | 5/2010 | Bond et al. | |
| 2010/0176823 A1 | 7/2010 | Thompson et al. | |
| 2010/0176892 A1 | 7/2010 | Thompson et al. | |
| 2010/0177940 A1 | 7/2010 | Dean et al. | |
| 2010/0180136 A1 | 7/2010 | Thompson et al. | |
| 2010/0189314 A1 | 7/2010 | Benkley et al. | |
| 2010/0208953 A1 | 8/2010 | Gardner et al. | |
| 2010/0244166 A1 | 9/2010 | Shibuta et al. | |
| 2010/0272329 A1 | 10/2010 | Benkley | |
| 2010/0284565 A1 | 11/2010 | Benkley et al. | |
| 2011/0002461 A1 | 1/2011 | Erhart et al. | |
| 2011/0018556 A1 | 1/2011 | Le et al. | |
| 2011/0102567 A1 | 5/2011 | Erhart | |
| 2011/0102569 A1 | 5/2011 | Erhart | |
| 2011/0175703 A1 | 7/2011 | Benkley | |
| 2011/0176307 A1 | 7/2011 | Fan et al. | |
| 2011/0182486 A1 | 7/2011 | Valfridsson et al. | |
| 2011/0214924 A1 | 9/2011 | Perezselsky et al. | |
| 2011/0267298 A1 | 11/2011 | Erhart et al. | |
| 2011/0298711 A1 | 12/2011 | Dean et al. | |
| 2011/0304001 A1 | 12/2011 | Erhart et al. | |
| 2012/0044639 A1 | 2/2012 | Garcia | |

FOREIGN PATENT DOCUMENTS

| | | |
|---|---|---|
| EP | 0929028 A2 | 1/1998 |
| EP | 0905646 A1 | 3/1999 |
| EP | 0973123 A1 | 1/2000 |
| EP | 1018697 A2 | 7/2000 |
| EP | 1139301 A2 | 10/2001 |
| EP | 1531419 A2 | 5/2005 |
| EP | 1533759 A1 | 5/2005 |
| EP | 1538548 A2 | 6/2005 |
| EP | 1624399 B1 | 2/2006 |
| EP | 1775674 A1 | 4/2007 |
| EP | 1939788 A1 | 7/2008 |
| GB | 2331613 A | 5/1999 |
| GB | 2480919 | 12/2011 |
| JP | 01094418 A2 | 4/1989 |
| JP | 04158434 A2 | 6/1992 |
| JP | 2005011002 A | 1/2005 |
| JP | 2005242856 | 9/2005 |
| JP | 2007305097 A | 11/2007 |
| TW | 200606745 A | 2/2006 |
| TW | 200620140 A | 6/2006 |
| TW | 200629167 A | 8/2006 |
| WO | WO 90/03620 A1 | 4/1990 |
| WO | WO 98/58342 A1 | 12/1998 |
| WO | WO 99/028701 A1 | 6/1999 |
| WO | WO 99/43258 A1 | 9/1999 |
| WO | WO 01/22349 A1 | 3/2001 |
| WO | WO 01/94902 A2 | 12/2001 |
| WO | WO 01/94902 A3 | 12/2001 |
| WO | WO 01/95304 A1 | 12/2001 |
| WO | WO 02/11066 A1 | 2/2002 |
| WO | WO 02/47018 A2 | 6/2002 |
| WO | WO 02/47018 A3 | 6/2002 |
| WO | WO 02/061668 A1 | 8/2002 |
| WO | WO 02/077907 A1 | 10/2002 |
| WO | WO 03/063054 A2 | 7/2003 |
| WO | WO 03/075210 A2 | 9/2003 |
| WO | WO 2004/066194 A1 | 8/2004 |
| WO | WO 2004/066693 A1 | 8/2004 |
| WO | WO 2005/104012 A1 | 11/2005 |
| WO | WO 2005/106774 A2 | 11/2005 |
| WO | WO 2005/106774 A3 | 11/2005 |
| WO | WO 2006/040724 | 4/2006 |
| WO | WO 2006/041780 A1 | 4/2006 |
| WO | WO 2007/011607 A1 | 1/2007 |
| WO | WO 2008/033264 A2 | 3/2008 |
| WO | WO 2008/033264 A3 | 3/2008 |
| WO | WO 2008/033265 A2 | 6/2008 |
| WO | WO 2008/033265 A3 | 6/2008 |
| WO | WO 2008/137287 A1 | 11/2008 |
| WO | WO 2009/002599 A2 | 12/2008 |
| WO | WO 2009/002599 A3 | 12/2008 |
| WO | WO 2009/029257 A1 | 6/2009 |
| WO | WO 2009/079219 A1 | 6/2009 |
| WO | WO 2009/079221 A2 | 6/2009 |
| WO | WO 2009/079257 A1 | 6/2009 |
| WO | WO 2009/079262 A1 | 6/2009 |
| WO | WO 2010/034036 A1 | 3/2010 |
| WO | WO 2010/036445 A1 | 4/2010 |
| WO | WO 2010/143597 A1 | 12/2010 |
| WO | WO 2011/088248 A1 | 1/2011 |
| WO | WO/2011/088252 A1 | 1/2011 |
| WO | WO 2011/053797 | 5/2011 |

OTHER PUBLICATIONS

Maltoni, "Handbook of Fingerprint Recognition", XP002355942 Springer, New York, USA, Jun. 2003 pp. 65-69.

Vermasan, et al., "A500 dpi AC Capacitive Hybrid Flip-Chip CMOS ASIC/Sensor Module for Fingerprint, Navigation, and Pointer Detection With On-Chip Data Processing", IEEE Journal of Solid State Circuits, vol. 38, No. 12, Dec. 2003, pp. 2288-2294.

Ratha, et al. "Adaptive Flow Orientation Based Feature Extraction in Fingerprint Images," Pattern Recognition, vol. 28 No. 11, 1657-1672, Nov. 1995.

Ratha, et al., "A Real Time Matching System for Large Fingerprint Databases," IEEE, Aug. 1996.

Suh, et al., "Design and Implementation of the AEGIS Single-Chip Secure Processor Using Physical Random Functions", Computer Architecture, 2005, ISCA '05, Proceedings, 32nd International Symposium, Jun. 2005 (MIT Technical Report CSAIL CSG-TR-843, 2004.

Rivest, et al., "A Method for Obtaining Digital Signatures and Public-Key Cryptosystems", Communication of the ACM, vol. 21 (2), pp. 120-126. (1978).

Hiltgen, et al., "Secure Internet Banking Authentication", IEEE Security and Privacy, IEEE Computer Society, New York, NY, US, Mar. 1, 2006, pp. 24-31, XP007908655, ISSN: 1540-7993.

Hegt, "Analysis of Current and Future Phishing Attacks on Internet Banking Services", Mater Thesis. Techische Universiteit Eindhoven—Department of Mathematics and Computer Science May 31, 2008 , pp. 1-149, XP002630374, Retrieved from the Internet: URL:http://alexandria.tue.nl/extral/afstversl/wsk-i/hgt2008.pdf [retrieved on Mar. 29, 2011] *pp. 127-134, paragraph 6.2*.

Gassend, et al., "Controlled Physical Random Functions", In Proceedings of the 18th Annual Computer Security Conference, Las Vegas, Nevada, Dec. 12, 2002.

Wikipedia (Dec. 2006). "Integrated circuit" Revision as of Dec. 10, 2006. http://en.widipedia.org/wiki/Integrated_circuit.

BELLAGIODESIGNS.COM (Internet Archive Wayback Machine, www.bellagiodesigns.com date: Oct. 29, 2005).

Wikipedia (Mar. 2003). "Integrated Circuit," http://en.wikipedia.org/wiki/integrated_circuit. Revision as of Mar. 23, 2003.

Closed Loop Systems, The Free Dictionary, http://www.thefreedictionary.com/closed-loop+system (downloaded Dec. 1, 2011).

Feedback: Electronic Engineering, Wikipedia, p. 5 http://en.wikipedia.org/wiki/Feedback#Electronic_engineering (downloaded Dec. 1, 2011).

Galy et al. (Jul. 2007) "A full fingerprint verification system for a single-line sweep sensor." IEEE Sensors J., vol. 7 No. 7, pp. 1054-1065.

* cited by examiner

SMART CARD SYSTEM WITH ERGONOMIC FINGERPRINT SENSOR AND METHOD OF USING

This application is related to U.S. Non-Provisional application Ser. No. 11/957,359, filed Dec. 14, 2007, entitled "Smart Card System and Docking Device With Ergonomic Fingerprint Sensor."

BACKGROUND

Many modern pocket sized devices exist and are being developed that contain or have access to very sensitive information. Examples include cellular phones that can access a cellular network, smart cards, and other hand held pocket sized devices. If misappropriated, such devices can give an unauthorized user free phone system access, access to private telephone numbers and contact information, internet access, and access to other sensitive information. To improve security, fingerprint sensors are highly useful, however the size and cost of such sensors is often prohibitive in such very small, low-cost devices.

Although any type of fingerprint sensor with suitable size and robustness characteristics can be used for these applications, one class of fingerprint sensors that are particularly useful for ultra-small, low-cost devices are deep finger penetrating radio frequency (RF) based sensors. These are described in U.S. Pat. Nos. 7,099,496; 7,146,024; and U.S. Patent Publications US 2005/0244038 for "Finger Position Sensing Methods and Apparatus" to Benkley (now U.S. Pat. No. 7,463,756); US 2006/0083411 for "Finger Sensing Assemblies and Methods of Making" to Benkley; US 2005/0244039 for "Methods and Apparatus for Acquiring a Swiped Fingerprint Image" to Geoffroy and Buxton; and US 2007/0031011 for "Electronic Fingerprint Sensor with Differential Noise Cancellation" to Erhart, Keyvani, Benkley, and Jandu (now U.S. Pat. No. 7,460,697) and contents of these patents and patent applications are incorporated herein by reference. These types of sensors are commercially produced by Validity Sensors, Inc, San Jose Calif. This class of sensor mounts the sensing elements on a thin, flexible, and environmentally robust support, and the IC used to drive the sensor resides in a protected location some distance away from the sensing zone. Such sensors are particularly advantageous in applications where small sensor size and sensor robustness is critical.

Smart cards are an excellent example of a pocket sized, low-cost, portable device where fingerprint sensors would be particularly desirable. Smart cards are electronic devices, typically in the shape of a conventional wallet-sized thin rectangular credit card. Smart cards typically contain active electronic components, such an internal processor and secure memory, which is used to hold sensitive information. Smart cards are often used for financial transactions, such as purchasing products and services, or depositing or retrieving money from financial institutions. As a result, smart cards can be viewed as a portable means of transferring money, and in fact can be considered to be a higher functionality version of a credit card. Throughout this disclosure, the term "smart card" will be considered to also include such higher functionality credit cards as well. The incentive for unscrupulous users to illegitimately acquire and falsify smart cards (and smart credit cards) is thus quite high, and methods and systems to ensure smart card security are quite desirable.

One of the major ways that a smart card can be misused is through physical theft, where a smart card simply falls into the hands of an unauthorized user. Another common security breech is through electronic or security number theft, where the card itself is not misplaced, but its corresponding identification numbers and codes fall into the wrong hands.

In theory, both types of security breech may be prevented by incorporating fingerprint sensors into the smart card. If such sensors were present, legitimate users could verify their identity upon initial receipt of the card, and at certain key times thereafter, by fingerprint swipes. Although attractive, the technical challenges of implementing fingerprint sensors into smart cards are substantial. Although other sizes are quite possible, smart cards are often designed to meet the ISO/IEC 7810 standard for identification cards, such as the ID-1 standard which typically calls for thin credit-card-like rectangular dimensions of 85.60×53.98 mm (3⅜"×2⅛") and thicknesses of only 0.76 mm (approximately 0.03"). Even if the thickness specification is relaxed to several mm, such as 5 mm or less, Fitting a fingerprint scanner and associated circuitry into such a small space is challenging. An additional problem is that smart cards typically are subjected to demanding environmental conditions, such as being stored and retrieved from a wallet for extended periods of time, any sensor and circuitry on such cards must be extremely robust.

Consider the engineering challenges: not only must the fingerprint sensor itself be paper thin and robust (which rules out many types of conventional but bulky or fragile fingerprint sensors), but the associated electronic circuitry, such as the processor, memory, any display device, electrical contact or communication device, and any battery used to power the unit must also be extremely thin. Small and thin batteries have correspondingly low amounts of stored energy. For example, a typical miniature battery might have a power capacity of only between 15 and 30 milliamp hours. Thus, in addition to small sensors, efficient sensor and sensor circuitry power utilization are also critical.

Here ergonomic factors also come into play. When not reading a fingerprint swipe, the smart card's fingerprint sensors and circuitry can be in a hibernation state and draw minimal amounts of power. However when reading a fingerprint swipe, fingerprint scanners require appreciable amounts of power. For example, a fingerprint scanner might draw 100 milliamps for two seconds during a swipe. For a 15 milliamp hour battery, the total reserve power is 54,000 milliamp seconds. Each swipe might consume as much as 200 milliamp seconds of power. Thus in some scenarios, a smart card's battery might be totally used up after only 270 fingerprint swipes.

Unfortunately improper fingerprint swipes often use as much power as proper fingerprint swipes. If, due to ergonomic issues, a user has to make repeated attempts to obtain a valid fingerprint swipe, battery life would suffer, and the practicality of such a smart card for routine, long-term, use would become minimal. Thus methods and devices to read fingerprint swipes quickly, accurately, and with minimal need for repeats due to improper user technique are highly useful.

Returning to the discussion of fingerprint sensing devices, a number of devices and techniques exist for sensing, capturing, and reconstructing the image of a fingerprint as it moves across a sensor array. Though many devices exist to sense and record an entire fingerprint, these devices tend to be relatively large. To save space and to be compatible with small portable devices, partial fingerprint sensing devices, such as the previously discussed Validity sensors, have been developed.

Partial fingerprint sensing devices have a sensing area that is smaller than the fingerprint area to be imaged. This is desirable because this type of sensor takes up much less space than a full fingerprint sensor, but to function properly, the user must move his finger and manually "swipe" it across the sensing area.

These sensing devices generally consist of one or more one-dimensional imaging arrays of sensors (imaging lines) disposed perpendicular to the axis of motion. For example, one common configuration used for a fingerprint sensing surface includes CCD (charge coupled devices) or C-MOS circuits. These components are embedded in a sensing surface to form a matrix of pressure sensing elements that generate signals in response to pressure applied to the surface by a finger. These signals are read by a processor and used to reconstruct the fingerprint of a user and to verify identification. Other devices include a matrix of optical sensors that read light reflected off of a person's finger and onto optical elements. The reflected light is converted to a signal that defines the fingerprint of the finger analyzed, and is used to reconstruct the fingerprint and to verify identification. As previously discussed, more modern devices, such as the Validity fingerprint sensors, are based on static or radio frequency (RF) devices configured to measure the intensity of electric fields conducted by finger ridges and valleys, such as deep finger penetrating radio frequency (RF) based sensing technology, and use this information to sense and create the fingerprint image.

As the finger surface is moved across the sensor, portions of the fingerprint are sensed and captured by the device. These data from these various portions is usually then stored in memory (working memory), and reconstructed using an electronic processor, such as a microprocessor, into a mosaic or overlapping image that recreates the entire fingerprint. Often the processor will then compare this mosaic image in working memory with an authorized fingerprint stored in fingerprint recognition memory, and determine if there is a match or not. If there is a match, the processor may then allow sensitive information (financial data, security codes, etc.) stored in secure memory to be accessed by external devices.

As might be imagined, this process of scanning and fingerprint reconstruction requires extensive processing resources for retrieving the partial fingerprint data and running the algorithms need to reconstruct the entire fingerprint. Again this takes electrical power, which is problematic when battery size is limited. Thus again, methods and devices to improve the efficiency of this process are desirable. In particular, user interfaces, designs, and systems that encourage correct finger swipes are critical.

For example, in swipe sensors used for fingerprint imaging, it is important that a user properly align the finger along with the fingerprint sensor so that a high quality image can be captured. If, for example, a user swipes the finger at one or more improper angles, a poor fingerprint image may be captured. At a minimum, additional computational time and energy will be needed by any processor that attempts to interpret the image, and more likely, a rescan will be required, significantly lowering battery life and also inconveniencing the user.

Therefore, a need exists in the art for a useful fingerprint sensor system that can be incorporated in a small device, such as a smart card, that operates without excessive size, power, or processing computational resources. There further exists a need in the art for user interfaces and guidance devices to help insure that users will correctly use such devices. As will be seen, the invention accomplishes these functions in an elegant manner.

BRIEF SUMMARY OF THE INVENTION

The present invention discloses a small unitized device with an embedded fingerprint reader, such as unitized smart card device, which also contains various ergonomic guides to help ensure that the fingerprint sensor is used (swiped) in a correct manner. Usually the smart card will additionally contain secure memory that contains confidential information, such as financial information, passwords, encryption information in the like. The smart card will also usually contain an onboard processor to run the fingerprint sensor, and this onboard processor will partially or fully unlock the contents of the smart card's secure memory if the card's onboard fingerprint sensor detects that an authorized user has accessed the device. The smart card may also contain a battery.

In some embodiments, the smart card will be designed to dock with an external docking station. This docking station may act to facilitate communication between the smart card's fingerprint sensor, onboard secure memory, and external computerized devices. The docking station may also recharge the smart card's battery. The docking station will usually itself be configured with slots or other openings to allow users to access the smart card's fingerprint sensor while the smart card is docked with the docking station. The docking station itself may also or alternatively contain ergonomic guides to help ensure that the smart card's fingerprint sensor is used (swiped) in a correct manner. This docking station may in turn function as part of a large stationary device, such as an automated teller machine (ATM), or it may function as part of a portable credit card reader (such as a wireless credit card reader that reads the credit card magnetic stripe), or other device.

In another embodiment, the smart card can be configured to be backwards compatible with a standard "dumb" credit card. In this alternative embodiment, the smart card can function either on a standalone basis, or with a standard "dumb" credit card magnetic strip reader. When an authorized user uses the card, the backwards compatible smart card either generates a visual credit card verification number, or alters its magnetic bits in order to be backwards compatible with telephone and internet web browser order entry systems, as well as older style magnetic strip reader systems.

BRIEF DESCRIPTION OF THE DRAWINGS

FIG. 2A shows an example where the finger angle is too high.

FIG. 2B shows an example of a proper finger angle.

FIG. 2C shows an example where the finger angle is improper in the opposite direction.

FIG. 2D shows a top view showing a proper finger swipe direction.

FIG. 2E shows a top view showing a finger swipe in an improper direction.

FIG. 2F shows an example of a finger swipe using an edge mounted partial fingerprint sensor.

FIG. 3A shows a depressed or tactilely distinguishable area over a partial fingerprint sensor.

FIG. 3B shows tactile or sensing edge guides on either side of a partial fingerprint sensor.

FIG. 3C shows a top view of the depressed or tactilely distinguishable area over a partial fingerprint sensor.

FIG. 3D shows a side view of ergonomic edge tactile or sensing edge guides that progress to the edge of a fingerprint sensing smart card or device.

FIG. 5A shows a simple slot configuration with no guides.

FIG. 5B shows a slot configuration with two edge guides.

FIG. 5C shows a simple slot configuration, where the slot opening extends to the edge of the docking station.

FIG. 5D shows a double slot opening configuration intended to be used with smart cards equipped with finger activated navigation sensors.

FIG. 5E shows a slot opening configuration where the smart card is equipped with an alternate type of finger activated navigation sensor.

FIG. 5F shows a slot opening configuration where the smart card is also equipped with finger directional sensors.

FIG. 5G shows a slot configuration where the smart card is equipped with fingerprint with fingerprint swipe speed sensors.

DETAILED DESCRIPTION

Figure 1:
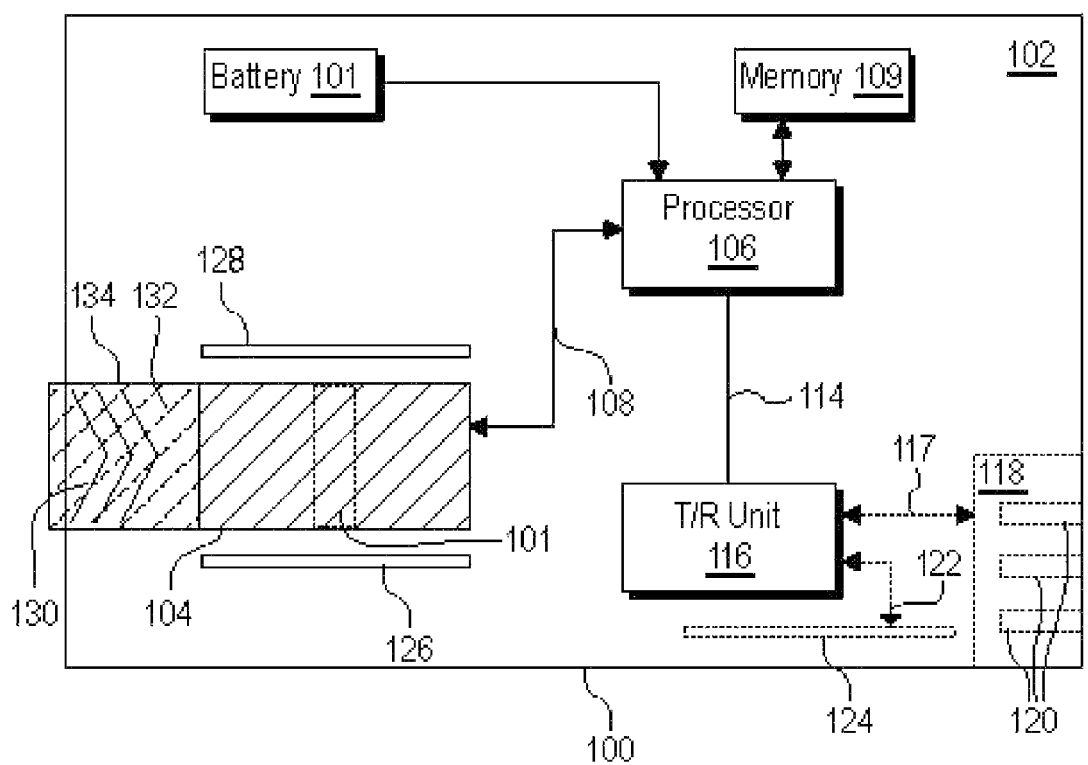
FIG. 1 shows an example of the circuitry and ergonomic guides used for a unitized "smart card" device with a partial fingerprint reader.

Although this invention can work with a wide variety of partial fingerprint sensors, in order to give specific example, much of the discussion will focus on deep finger penetrating radio frequency (RF) sensing technology, such as those manufactured by Validity Sensors, Inc. Thus to begin, this technology will be discussed in more detail.

Validity partial fingerprint sensors measure the intensity of electric fields conducted by finger ridges and valleys, such as deep finger penetrating radio frequency (RF) based sensing technology, and use this information to sense and create the fingerprint image. These devices create sensing elements by creating a linear array composed of many miniature excitation electrodes, spaced at a high density, such as a density of approximately 500 electrodes per inch. The tips of these electrodes are separated from a single sensing electrode by a small sensor gap. The electrodes are electrically excited in a progressive scan pattern and the ridges and valleys of a finger pad alter the electrical properties (usually the capacitive properties) of the excitation electrode—sensing electrode interaction, and this in turn creates a detectable electrical signal. The electrodes and sensors are mounted on thin flexible printed circuit support, and these electrodes and sensors are usually excited and the sensor read by an integrated circuit chip (scanner chip, driver chip, scan IC) designed for this purpose. The end result is to create a one dimensional "image" of the portion of the finger pad immediately over the electrode array and sensor junction.

The main drawback of partial fingerprint sensors is that in order to obtain a valid fingerprint scan, the user must swipe his or her finger across the sensor surface in a relatively uniform manner. Unfortunately, due to various human factors issues, this usually isn't possible. In the real world, users will not swipe their fingers with a constant speed. Some will swipe more quickly than others, some may swipe at non-uniform speeds, and some may stop partially through a scan, and then resume. In order to account for this type of variation, modern partial fingerprint sensors often incorporate finger position sensors to determine, relative to the fingerprint sensor, how the overall finger position and speed varies during a finger swipe.

One type of finger position indicator, represented by U.S. Pat. No. 7,146,024, and Patent Publications US 2005/0244038 for "Finger Position Sensing Methods and Apparatus" to Benkley (now U.S. Pat. No. 7,463,756) and US 2005/0244039 for "Methods and Apparatus for Acquiring a Swiped Fingerprint Image" to Geoffroy and Buxton (the contents of which are incorporated herein by reference) detects relative finger position using a long array of electrical drive plate sensors. These plates sense the bulk of a finger (rather than the fine details of the fingerprint ridges), and thus sense the relative position of the finger relative to the linear array used for fingerprint sensing. A second type of fingerprint position indicator, represented by US 2007/0031011 for "Electronic Fingerprint Sensor with Differential Noise Cancellation" to Erhart, Keyvani, Benkley, and Jandu (now U.S. Pat. No. 7,460,697) (the contents of which are incorporated herein by reference), uses two linear partial fingerprint sensors, located about 400 microns apart. The two linear sensors use the slight timing differences that occur when a fingerprint swipe first hits one sensor and then the other sensor to detect when a fingerprint edge passes over the sensors. This technique can also detect relative speed of passage over the two partial sensors. This type of information can be used to deduce overall finger location during the course of a fingerprint swipe.

Examples of partial fingerprint readers equipped with finger location sensors include the Validity VFS131 and VFS201 sensors.

The VFS131 uses a series of electrical sensing plates to determine the relative position (location) of the bulk of the finger. In contrast to the electrodes used to determine the fine structure of the fingerprint ridges and valleys, these electrical sensing plates sense the location of the bulk of the finger, and are differentially excited as the finger moves up and down over the course of a finger swipe.

The VFS201 finger location sensor works by a different method. Instead of finger location plates, the VFS201 contains two linear fingerprint sensors, each parallel to each other, and each separated by a distance of about 400 microns from the other. These two fingerprint sensors can be used to deduce fingertip position and velocity because a finger tip or ridge will first pass over one sensor slightly before the other. The relative timing difference between a fingerprint pattern arriving at the first sensor, relative to the same pattern, can be used to derive finger speed. By keeping track of this finger speed history, the relative position of the sensor relative to the finger pad can be computed.

As the finger surface is moved across the sensor, portions of the fingerprint are sensed and captured by the device's one dimensional scanner, creating an array of one dimensional images indexed by order of data acquisition, and/or alternatively annotated with additional time and/or finger pad location information. Circuitry, such as a computer processor or microprocessor, then creates a full two-dimensional fingerprint image by creating a mosaic of these one dimensional partial fingerprint images.

Often the processor will then compare this recreated two dimensional full fingerprint, usually stored in working memory, with an authorized fingerprint stored in a fingerprint recognition memory, and determine if there is a match or not. Examples of such fingerprint matching software are disclosed in U.S. Pat. Nos. 7,020,591 and 7,194,392 by Wei et. al., this software is also commercially available from sources such as Cogent systems, Inc., South Pasadena, Calif.

If the scanned fingerprint matches the record of an authorized user, the processor then usually unlocks a secure memory or computer system and allows the user access. This enables various types of sensitive data and information (financial data, security codes, etc.), to be protected from unauthorized users, yet still be easily accessible to authorized users.

However such methods are still critically dependent upon user ergonomics. No amount of processing power can interpret a fingerprint image if the user has deviated too far from correct procedure.

Referring to FIG. 1, one embodiment of a smart card that has a fingerprint sensor and related user guides for using the sensor is illustrated. This device is a unitized device that contains the scanner, processor, and memory containing sensitive information present as a single, unitized, hand-held, unit.

The smart card (100) includes a smart card casing (102) configured to seal the components of the smart card into a unitized case. Typically case (102) is substantially the size of a modern or common credit card wherein the dimensions of the device are substantially compatible with the 85.60 mm×53.98 mm×0.76 mm size standard for ISO/IEC 7810 established by the International Standards Organization (ISO) and the International Electrotechnical Commission (IEC) for identification cards and further wherein the card has an upper surface, a lower surface, and side surfaces. The smart card (100) includes a fingerprint sensor (104) (usually a partial fingerprint sensor) configured to sense the presence of a fingerprint, capture an image of the fingerprint, and store the fingerprint. Card (100) may optionally contain a thin battery (101) used to power the sensor (104) and optionally some of the other card electrical components. The smart card may or may not need a battery, wherein the smart card is configured to be powered when installed into a carrier. Alternatively, a battery may be included within the card, and may optionally be chargeable when installed within a carrier.

The sensor (104), which may be a deep finger penetrating RF based sensor or other type sensor, communicates with a processor (106) via a communication line (108) when a fingerprint image is captured. Such an image may be stored in working memory (109). In this example, memory (109) may be working memory (e.g. cache or RAM), fingerprint recognition memory (cache, RAM, Flash or other type of persistent memory), and secure memory (any type). This memory is designed to be accessed by the processor for processing or later transmission.

The communication line (108) is configured to receive data from the sensor (104), and process and store the data related to a fingerprint image. Also, the communication line (108) may receive control commands from a processor (often low current consumption microprocessor) for controlling the sensor (104). For example, a sensor (104) may be configured to sense the proximity of a finger when a user holds a fingerprint within proximity of the fingerprint sensor (104). In response, the processor may control the fingerprint sensor (i.e. power it up to full power) to receive an image of the fingerprint while a use swipes it across the sensor. The processor (106) will retrieve this fingerprint image information, as well as finger location information from the optional finger location sensing elements.

For example, the speed at which a user swipes a fingerprint across the sensor may be detected by sensor (104) or related fingerprint movement sensors, and transmitted to the processor (106) for use in reconstructing the fingerprint image. Furthermore, the direction of the fingerprint being swiped may also be detected by finger location sensors mounted on sensor (104) or related fingerprint movement sensors, and used by the processor to determine the direction at which the fingerprint swipes across the sensor. This information can be combined and stored in memory so that a proper image can be recorded of a fingerprint being swiped.

The processor (106) may perform the complete processing of such an image. Alternatively processor (106) may only partially or minimally reconstruct the image, and instead an exterior processor (not shown) may perform this and other operations, using data stored in working memory (109) in order to reconstruct the image of the fingerprint. For example, internal processor (106) may transmit information related to a user fingerprint via communication line (114) to a transmit and receive unit (116). Such a transmit and receive unit may in turn transmit the fingerprint sensor information via a communication line (117) to an electrical contact component (118). The electrical contact component (118) may be a direct electrical conductor contact system having electrical contacts (120) that may be connected to another device (such as a docking device) for receiving the fingerprint image information. Contact component (118) may also be used to receive power from an external power source, and use this power to directly power the smart card (100) and/or charge the battery (101) that powers the smart card (100).

Alternatively processor (106) will take the fingerprint mosaic from working memory (109) and compare this data with one or more authorized fingerprints stored in fingerprint recognition memory (109). If there is a match, processor (106) may then make sensitive information (financial data, identity data, cryptographic data, passwords, etc.) stored in secure memory (109) available to read or write to external devices. (In this drawing, for simplicity, figure (109) shows both working memory, fingerprint recognition memory, and secure memory denoted as a single box).

Alternatively, transmit/receive unit (116) may be a wireless radio frequency transmit/receive communication device, and optionally may be connected (122) to an antennae, such as an RF antennae (124), for wireless transmission to another device. As discussed in more detail below, this information may be transmitted to a device that is proximal to the smart card (100), such as a banking ATM machine, retail store smart card reader, or other device.

Other embodiments of the invention can be devised that make the smart card operate in a way that is backwards compatible with standard "dumb" magnetic strip credit cards. In these embodiments, transmit/receive unit (116) may be a unit that controls the magnetic properties of one or more bits on the card's magnetic strip. Alternatively, transmit/receive unit 116 may control a visual display (such as an electronic paper display mounted on the back of the card) that outputs an additional credit card verification number.

Using such backward compatible "smart cards", a user may swipe a finger, and the backwards compatible smart card may emulate a dumb card by either changing the magnetic bits on a magnetic stripe on the back of the backward compatible smart card, or or alternatively displaying an additional credit card verification number on the back of the backwards compatible smart card. Using this technique, a backwards compatible smart card can be used as if it were a standard "dumb" credit card, and would not require any specialized smart card docking terminal. Such a card could either function with no terminal at all, or would function with an old style "dumb" credit card magnetic swipe terminal.

To function without any terminal at all, a user could make a telephone purchase by first reading the credit card number on the front of the card to the sales clerk at the other end of the telephone. When the clerk asks for the credit card verification number on the other side of the credit card, an authorized user could swipe his or her finger, and the backwards compatible smart card would verify the correct fingerprint, and then display the correct credit card verification number on the back of the card. However if an unauthorized user attempted to use the backwards compatible smart card over the phone, the card would fail to verify a correct fingerprint, and thus either display no verification number or alternatively display an incorrect verification number. The net effect is that the backwards compatible smart card functions like a dumb credit card that "magically" knows if it is being used by the correct user or not.

Alternatively, the backwards compatible smart card could be used in a standard magnetic strip reading credit card terminal. As an example, consider a user making a purchase at a store that has a standard magnetic strip reading credit card reader. The user could first swipe his or her finger over the backwards compatible smart card, and the card could read the fingerprint, verify that it was proper, and in turn could alter the magnetic configuration of one or more credit card identification data bits on a simulated "dumb credit card" magnetic strip on the back of the card. When the clerk swipes the card, the correct serial number will be transmitted. However if an unauthorized user attempted to swipe the card, the card would fail to verify the fingerprint, and instead would alter the data bits on the simulated "dumb credit card" magnetic strip on the back of the card to give either an invalid number, or a number indicating that the card is being used by an unauthorized user.

According to the invention, the smart card (100) may include visual or tactile guides (125), (126) configured to guide a user in swiping a fingerprint across the sensor (104). Such a guide may be tactile (e.g. raised three dimensionally in respect to the flat surface of the casing (102)). Such a guide may even be configured with moving elements, such as slides that can be raised by the user during a scan, and then retracted for easier storage. Alternatively the guides may simply be visual, such as guides printed onto the smart card, or displayed by active displays on the smart card.

Smart card (100) may also contain power or reset switches, such as a user activation switch (not shown), that changes the card from low power consumption (sleep mode) to a medium power consumption mode, in which the fingerprint sensors are looking for the commencement of a fingerprint swipe. Once the swipe begins, fingerprint sensor (104) may send a signal to processor (106) instructing the processor to switch sensor (104) into a high power consumption fingerprint swipe analysis mode. Alternatively this function may be done by other circuits (not shown).

The sensor (104) may simply lay roughly flat along the larger plane of the smart card, and be oriented to sensing fingerprint swipes applied along the larger plane of the smart card. However other configurations are possible. As an alternative example, sensor (104) may be oriented along the thin edge of the smart card, and sense fingerprint swipes applied along the thin edge of the smart card. In still other configurations, sensor (104) may be an extended sensor with extended sensing element 132, and may include an overlapping sensor that covers both the planar portion and the edge of the smart card 134.

In such a sensor, user may do a fingerprint swipe over the surface or the edge of the smart card, and the sensor may be configured to receive an image from either the surface or the edge of the smart card.

As previously discussed, visual or tactile ergonomic guides (130) may also be included to guide a user in proper use. In this configuration, the guides (130) visually or tactilely instruct a user to swipe the sensor along a surface of the card (100) in the direction shown (105), effectively guiding a user to hold a finger (103) flat against the card (100) so that a proper image may be recorded. In some cases, guides (130) may even contain sensors that detect proper and improper finger angles, and actively work in conjunction with processor (106) and an optional display device (speaker, or visual display) to give feedback to the user if the user's technique is improper.

In one embodiment, ergonomic guides (130) may be made with a thin flat display material, such as electronic paper (e-paper). Such an electronic paper display could work in conjunction with fingerprint sensors on device (104) and processor (106) to give the user visual feedback as to the user's finger swipe technique. Electronic paper displays, suitable for credit card sized devices, are produced by E Ink corporation, Cambridge Mass., and are discussed in more detail in U.S. Pat. Nos. 6,473,072; 6,738,050, and other patents.

Alternatively or additionally, ergonomic guides (126), (128) would guide a user to swipe the sensor in the correct and consistent direction. Using the combination of these guides, a user is guided to properly swipe the sensor. The guides (130) may point in the other direction, guiding a user to swipe the sensor in another direction. Which direction the sensor is swiped depends on the application. As previously discussed, guides (126), (128), (130) may be printed or visual guides, sensing guides, passive or active displays, or alternatively may be raised or depressed portions of the surface of (100) so as to provide tactile as well as visual guiding to the user.

Figure 2A:
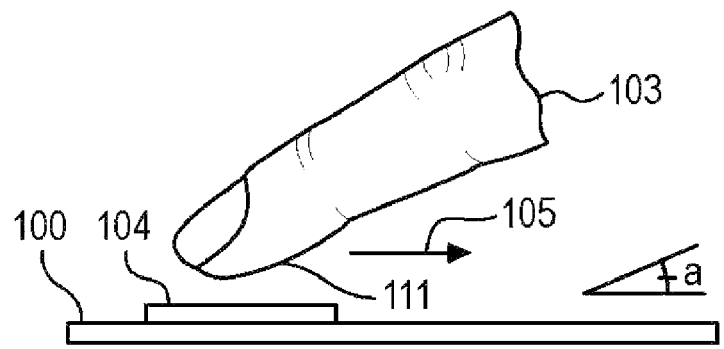
FIGS. 2A-2F show examples of various finger positions during a finger swipe.

Referring to FIGS. 2a through 2f, some common movements and problems associated with those movements are illustrated. Referring first to FIG. 2a, the smart card (100) includes sensor (104) for receiving a fingerprint from a user's finger, illustrated here as (103). First, in FIG. 2a, the swiping of the finger is illustrated in direction (105) at an angle of a. In this illustration, the finger is shown hovering above the sensor (104), where a user would swipe the finger (103) at an angle of a. As previously discussed, one problem with fingerprint sensors is that a user may swipe the sensor at such an angle at direction (105), producing poor image quality (for example only a partial fingerprint) of the fingerprint from the fingerprint surface (111). Without proper guides, a user would swipe at undesirable angles, leaving the sensor to pick up poor or fragmentary images of the fingerprint.

Figure 2B:
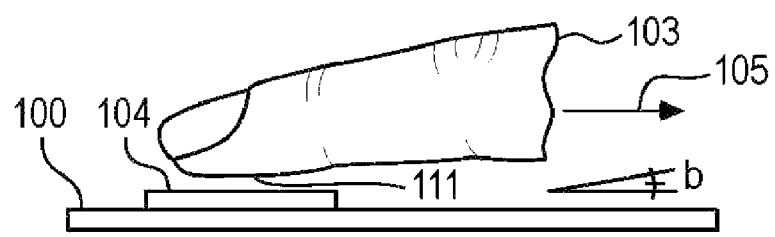

Referring to FIG. 2b, the user finger (103) is shown being swiped in a direction (105) at a lower angle b. This is the optimum swiping angle and direction for the device illustrated in FIG. 1, where the user is able to swipe the entire finger across the sensor (104) so that a proper and complete fingerprint image can be captured.

Figure 2C:
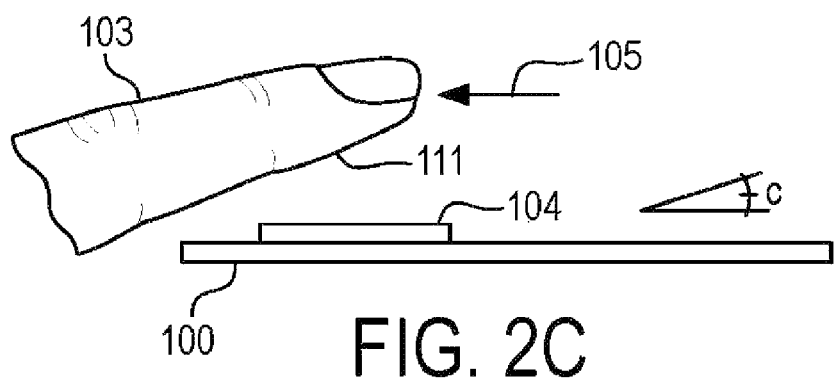

Referring to FIG. 2c, yet another problem is illustrated, where the user's finger (103) is swiped in direction (105) resulting in a swipe angle of c. This is similar to the card of FIG. 2b, but the swiping is in the other direction, allowing a user to swipe at an undesirable angle resulting in a low quality image (either a fragmentary fingerprint, an improperly detected fingerprint, or both) captured by the sensor (104).

Figure 2D:
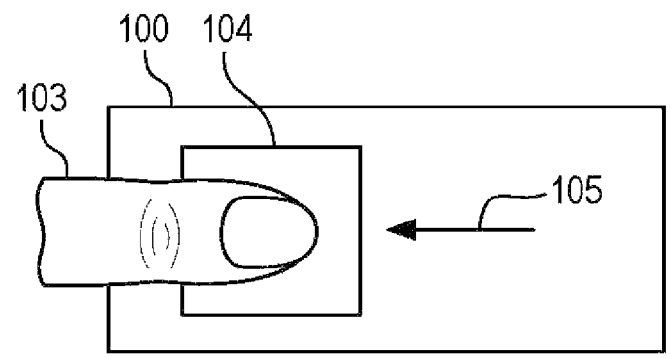

Referring to FIG. 2d, a top view of a user's finger (103) being swiped across the smart card (100), specifically across the sensor (104) in direction 105 is illustrated. This is a normal and proper swiping direction of the sensor.

Figure 2E:
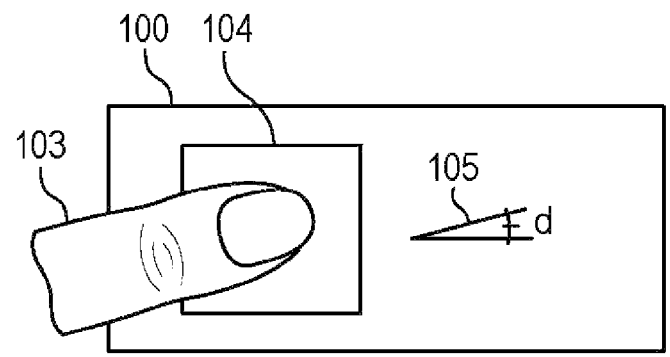

In contrast, FIG. 2e illustrates a less than optimum swiping direction, where the finger (103) is swiped in a direction of (105) at an angle d. This would result in a poor image capture in most conventional devices. In such a user action, the smart card (100) would need to have a processor/sensor combination that is capable of sensing the direction as well as the speed and the presence of the finger, and computing the appropriate fingerprint angle corrections. In this situation, at a minimum the fingerprint processing will impose higher computational processing times and power drain on the system and the risk of ultimately producing an unusable partial fingerprint scan is higher. Thus this type of off-angle swipe is undesirable.

Figure 2F:
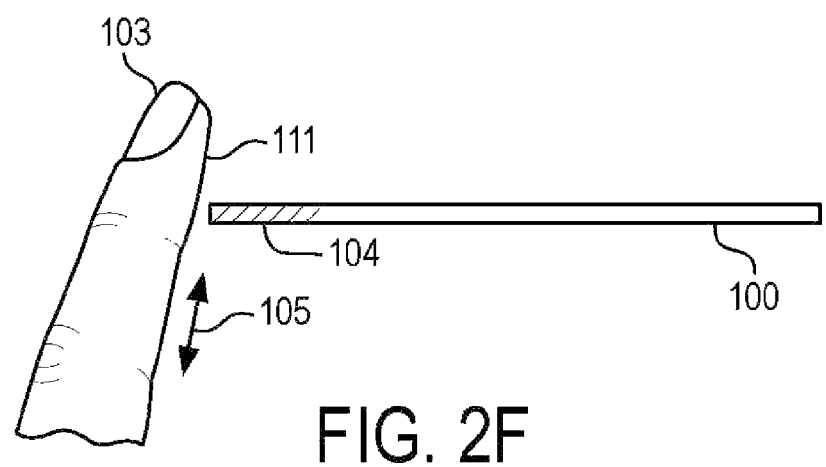

Referring to FIG. 2f, yet another problem is illustrated. Here the fingerprint sensor is an edge mounted sensor. This sensor (104) is located on the edge of smart card (100). This sensor is configured to sense and receive a fingerprint from a fingerprint surface (111) onto sensor (104), and in this configuration, the finger swiping action would be in more than one direction (105), such as either an up or down direction.

As can be seen in these FIGS. 2a through 2f, the direction at which a user swipes the fingerprint sensor can vary depending on the particular user. Thus, it is important to guide a user to swipe the fingerprint sensor properly, so that an adequate fingerprint image may be captured. According to the invention, either, visual, tactile, or combined visual and tactile guides are used to properly guide a user in swiping the sensor.

Referring now to FIGS. 3a through 3d, several embodiments of user guides are illustrated. First, in FIG. 3a, a smart card (136) is configured with a recessed or tactilely distinguishable (for example rough or dimpled) portion (138), where sensor (140) is located. In such a configuration, a user can move the finger (103) in direction (105), exposing the surface (111) to the sensor (140). The recess (138) guides a user by allowing the user to feel the tactilely distinguishable area and swipe the sensor through this area (138) in the proper direction. This, together with visual and or tactile guides (130), (126), (128) (FIG. 1) could properly guide a user to swipe the fingerprint across sensor (104). Thus, the guide configuration with indentation (138) enables a user to better swipe the sensors so that an optimal reading of the fingerprint surface (111) can be accomplished.

Figure 3A:
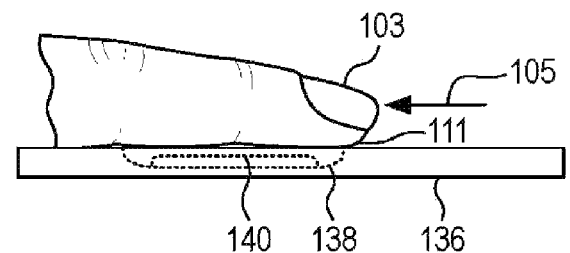
FIGS. 3A-3D show examples of ergonomic guides that can be used to help prevent improper finger placement during finger swipes over a partial fingerprint sensor.
Figure 3B:
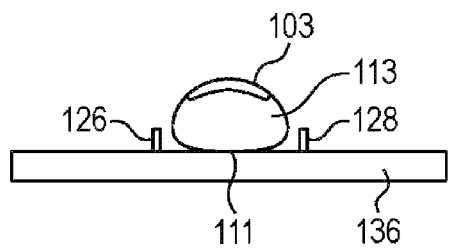

Referring to FIG. 3b, an illustration of a sensor with tactility distinguishable guides (126), (128) are illustrated. In this configuration, the guides (126), (128) are configured to guide the finger (103) where the tip of the finger (113) is illustrated. The guides, which can be configured in a number of configurations, sizes or shapes, allow a user to properly swipe the sensor in a direction that is suitable to the particular sensor configuration. The fingerprint surface (111) can be swiped across the sensor (104) (FIG. 1), and specifically across the effective sensor surface or other area so that an adequate and optimum fingerprint image can be captured by the sensor.

In other configurations, guides (126), (128) can be configured to detect excess pressure, be connected to processor (106), and warn the user when the finger is being swiped across guides (126), (128), rather than between guides (126), (128), by either a visual display (for example, causing an LCD or LED or electronic paper display mounted on card (100) to show a warning) or alternatively an audible alarm by causing a miniature audio speaker, such as a piezoelectric speaker, mounted on card (100) to beep.

Figure 3C:
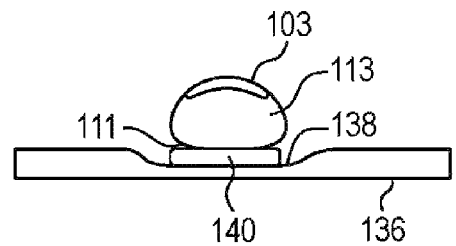

Referring to FIG. 3c, another angle of the sensor (136) (FIG. 3a) is illustrated. The tip of the finger (113) is illustrated for perspective, where the fingerprint surface (111) is swiped across sensor (140), which is located within the recess or tactilely distinguishable area (138) (here drawn as a recess for ease of illustration). In this configuration, a user can feel the proper direction that it needs to swipe the fingerprint for an adequate reading. In some cases, combining a visual electronic paper display with a tactile feedback such as an indentation or recess may be most effective.

Figure 3D:
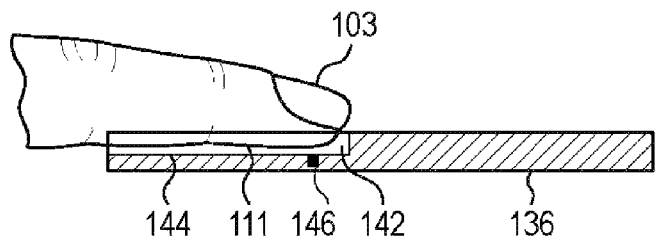

Referring to FIG. 3d, yet another embodiment is illustrated, where this embodiment is similar to the embodiment of FIG. 3a, but the recess or tactilely distinguishable area (142) extends to the edge of the card (144), wherein the sensor (146) is located within the recess (142).

Thus, these guides are useful in guiding a user's finger to swipe the sensor in a manner that optimizes the capturing of the fingerprint surface (111). Those skilled in the art will understand that many other configurations similar to these are possible, and such configurations may be derived in light of these illustrations and this description. Those skilled in the art will also understand that variations are possible within the scope of the invention, of which the spirit and scope is defined by the appended claims and all equivalents.

Referring to FIGS. 4a through 4e, yet another example of guides used for guiding a user in swiping a fingerprint sensor is illustrated. First, referring to FIG. 4a, one embodiment of the invention is illustrated where a docking station (400) is configured to receive a smart card (402) having fingerprint sensor (404) in the direction of (406) into the inside of the docking station. In addition to the guides shown, this docking station may contain other elements useful for smart card reading, such as optional devices to transmit information from the smart card to an external computer, phone, cell phone, terminal, or docking station manager, connected to docking station (400). The docking station may also contain optional devices to charge a battery located on smart card (100), via contacts (118), (120), magnetic induction coil, or other means.

This docking station may derive both its own power and data connections through a standard connector, such as a Universal Serial Bus (USB) connector, IEEE 1394 connector, serial connector, parallel connector, SPI connector etc., or alternatively derive its own power and data connection by other means such as an independent connection to an external power supply, external batteries, or the like.

When used with a docking station and an external computer or terminal, the functionality of the system may be enhanced through the use of software. This software, which may reside on the external computer, may read fingerprint and security data from the smart card (transmitted via transmit/receive unit (116)), and in turn use this data for passwords, encrypting files, and, especially when used in conjunction with a database containing large number of other fingerprints and security data, also used for passports, voting systems, and other security and access functions such as entering into secure areas. Again, software such as disclosed in U.S. Pat. Nos. 7,020,591 and 7,194,392 by Wei et. al., and commercially available from sources such as Cogent systems, Inc., South Pasadena, Calif., or other fingerprint recognition software, is useful for these purposes.

The docking station may include an opening (408) that corresponds to the sensor (404), allowing a user to swipe the sensor (404) through the opening (408). Optionally, the docking station may include visual or tactile guides (410), (412), similar to the guides (128), (126) of FIG. 1, so that a user will properly swipe the fingerprint sensor for a proper reading. The smart card (402) is received within the inside of the docking station (412) and held so that the user may swipe a finger over sensor 404 through the opening (408). Because this docking station may have access to external power and additional audio or visual communication means, it also is increasingly feasible to equip guides (410) and (412) with pressure or other sensors to actively sense when the user finger is being swiped in an improper manner, and communicate to the user by suitable audio or visual signals that an improved swipe technique is indicated, or alternatively communicate when the swipe angle and technique are acceptable.

Figure 4A:
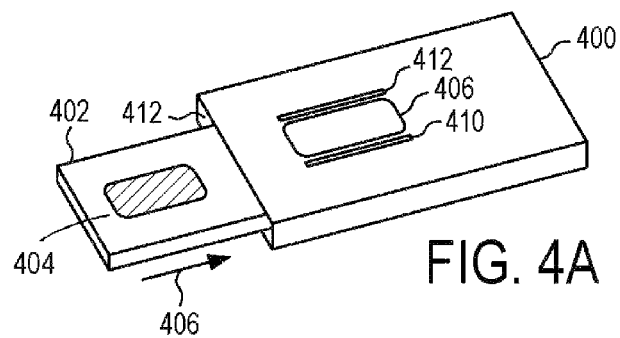
FIG. 4A shows a perspective view of a fingerprint reading smart card being inserted into a docking station.
Figure 4B:
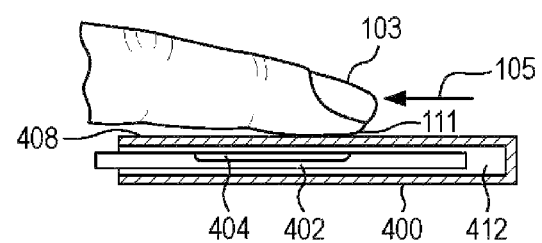
FIG. 4B shows a cut-away view of a finger protruding through a slot in a docking station. The user can perform a fingerprint swipe on the partial fingerprint reader mounted on the smart card, while the smart card is inserted inside a docking station.

Referring to FIG. 4b, a side cutaway view of the docking station (400) is illustrated. The smart card (402) is shown within the opening (412) of the docking station. The sensor (404) is shown exposed to the opening (408) so that a user's finger (103) can swipe the sensor (404) in the direction (105) so that the fingerprint surface (111) can be sensed by the sensor (404).

Figure 4C:
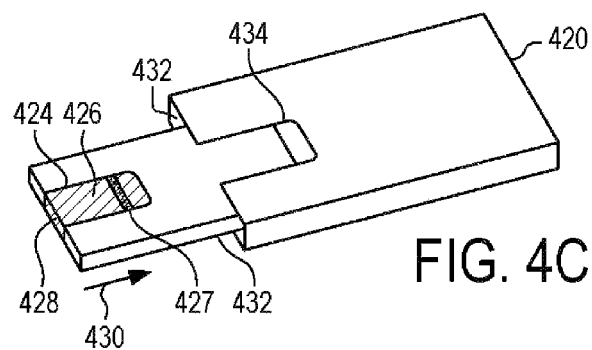
FIG. 4C shows an alternative fingerprint-reading smartcard and docking station. Here the fingerprint sensor is mounted near the edge of the smart card, and protrudes outside of the docking station.

Referring to FIG. 4c, yet another embodiment of the invention is illustrated, where the docking station (420) is configured to receive the smart card (422), which has a sensor (424) with one or both surfaces (426) and (428). In different configurations, the smart card may receive an image swiped across sensing area (427) which is within area (426), in such a configuration, the swiping action can be performed across the sensor so that the area (427) can capture the fingerprint image. Alternatively, edge surface (428) may be configured to receive an image, where a user may swipe across the surface (428), allowing the sensor (424) to capture the image from this edge. The docking station (420) is configured to receive the smart card (422) into the opening (432) in a direction (430) so that the smart card is received and held within the docking station.

Figure 4D:
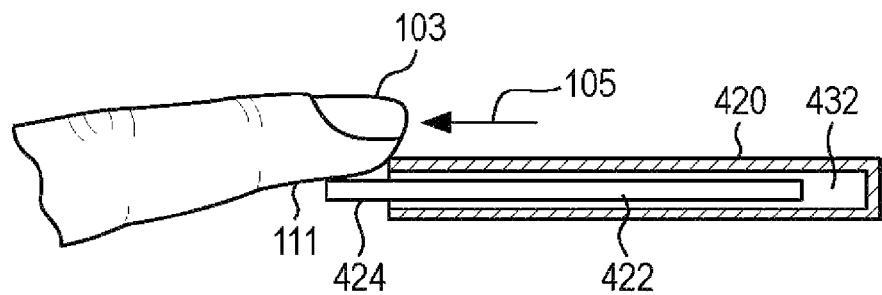
FIG. 4D shows a cut away view of a finger performing a finger swipe on a partial fingerprint reader. The fingerprint reader is mounted on or near the edge of a smart card, and the smart card in turn is inserted into a docking station.

Referring to FIG. 4d, a side cutaway view of the docking station (420) with the smart card (422) inserted therein is illustrated. The smart card (422) is held within the opening (432), and a user's finger (103) may swipe the sensor (424) so that an image of the fingerprint surface (111) can be captured. When swiping in the direction (105), the sensor can pick up and capture the image of the fingerprint surface (111).

Figure 4E:
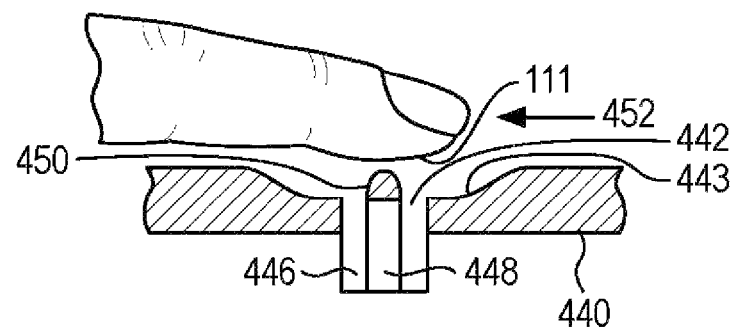
FIG. 4E shows a cut away view of an alternative configuration, in which the partial fingerprint reader is mounted on the edge of a smart card, and the smart card is vertically inserted into a docking station.

Referring to FIG. 4e, yet another embodiment of the docking station is illustrated, partially shown in FIG. 4e. The docking station (440) is shown as an opening through the casing (440), where the opening (442) is configured to receive a smart card. The casing (440) further includes ergonomic recess (443) configured to allow a user to feel and guide the finger (103) across the sensor for a reading. The fingerprint surface (111) can move in the direction of (452) so that the sensor (450) can pick up the image of the surface (111). In operation, the casing (440) is configured with the opening (442) within which to receive the smart card, and the inside casing (446) is configured to receive the smart card (448) and hold it for use in capturing the fingerprints imaging. The sensor (450) is configured to receive the image of a fingerprint surface (111) swiping across its surface. When moving in the direction (452), the sensor (450) can sense, capture and retrieve an image of the fingerprint surface (111).

Such a docking station may be configured within a portable device, or can be configured in a stationary device such as a bank ATM or other system.

Figure 5A:
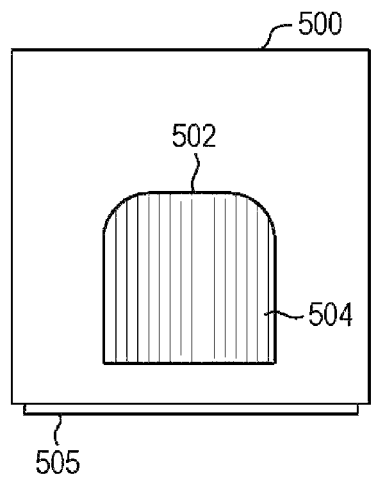
FIG. 5A-5G show various types of docking station slot openings and guides. These openings and guides enable a smart card, containing a partial fingerprint reader, to be finger swiped while the smart card is docked with the docking station.

Referring to FIGS. 5a through 5g, illustrations of different types of openings of a docking station are illustrated. Referring first to FIG. 5a, a docking station (500) has an opening (502), configured to expose itself to a smart card (505), specifically to the sensor surface (504). In this configuration, a user may swipe the sensor (504) through opening (502).

Figure 5B:
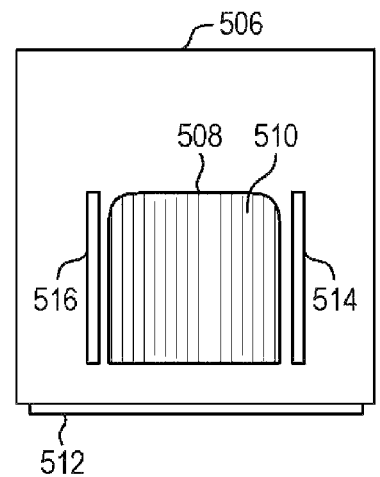
Figure 5C:
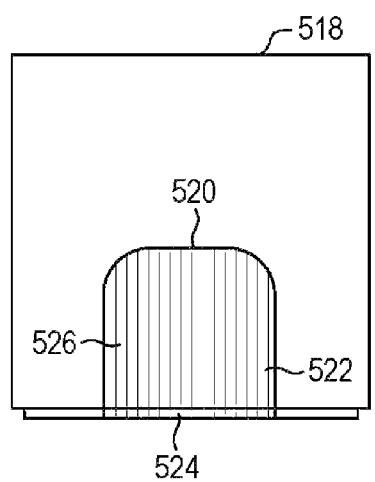

Referring to FIG. 5b, yet another embodiment is illustrated, where the docking station (506) has an opening (508), and is configured to expose the sensor surface (510) of the smart card (512) received within the docking station. The docking station further includes visual, tactile, or sensing guides (514), (516), similar to the guides (126), (128) of FIG. 1, and is configured to help a user guide the swiping of a fingerprint surface in a proper direction. Alternatively, the surface of the docking station may also have a visual display of the user's finger positioning technique, in which case the surface may contain an LCD (liquid crystal display) or electronic paper display (not shown).

Referring to 5c, yet another embodiment of a docking station (518) is illustrated with an opening (520), where the opening is exposed further and is able to expose a sensor having a surface (522) and/or surface (524) so that the surface (526) can be swiped by a user. In operation, either surface (524) or (526) may be swiped depending on the application.

Figure 5D:
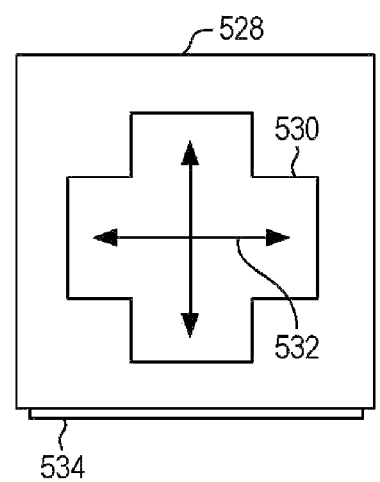

Referring to FIG. 5d, yet another embodiment of the docking station is illustrated, where the docking station (528) has an opening (530) that may accommodate navigation type sensors (532) that are located on smart card (534). In operation, a user may perform navigation operations by swiping in different directions across the sensor (532).

Figure 5E:
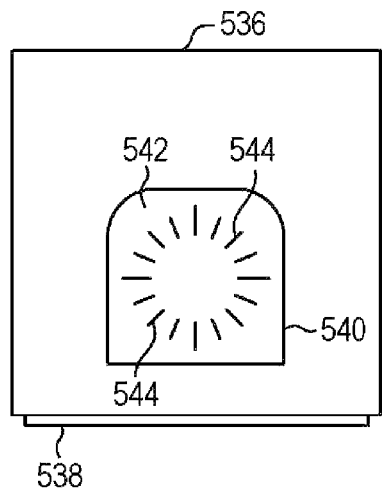

Referring now to FIG. 5e, yet another navigation application is illustrated, where docking station (536) is configured to receive the smart card (538), where the docking station includes an opening (540) for exposing the sensor surface (542) of the smart card. The sensor surface further includes direction and velocity sensors (544) for determining the speed and direction of a user's motions across the sensor.

Figure 5F:
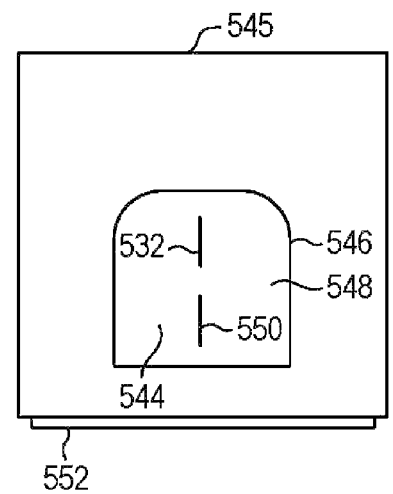

Referring to FIG. 5f, yet another navigation application is illustrated, a more simple application, where the docking station (545) has an opening (546) for exposing the sensor service (548) having speed sensors (550) on smart card (552). In such an application, the docking station (545) is configured to expose the sensor surface (548) for a user to strike in a direction in line with the sensors (550) so that the speed and image can be captured by the sensor.

Figure 5G:
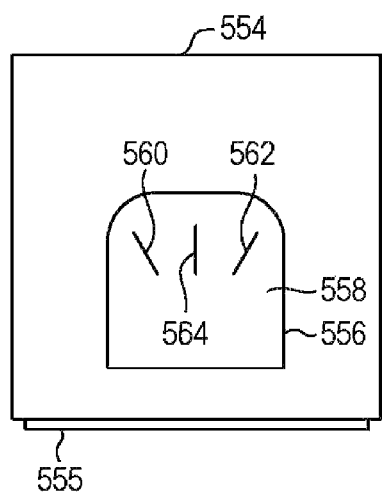

Referring to FIG. 5g, yet another application is illustrated, where the docking station (554) is configured to receive the smart card of (555) and to expose part of the smart card through opening (556) so that the sensor surface (558) can be accessed by a user. The sensor surface (558) may include sensors (560), (562), (564) that are configured to sense the speed of a fingerprint surface being swiped across surface (558).

Thus, the illustrations of FIGS. 5a through 5g illustrate the different types of configurations of docking stations and corresponding openings for proper and optimum ergonomic design so that a user can more practically swipe a fingerprint sensor so that an optimum image can be captured.

In addition to smart cards, the apparatus and method of the invention are useful for a broad range of other portable electronic devices where authentication is desired. In operation, the ergonomic guides discussed here enable the device to be used without a large number of unsuccessful fingerprint scans and waste of scarce onboard battery power. At the same time, the stored fingerprint and shared secret parameters discussed above can be used to more efficiently and quickly authenticate the device without the need to run the burdensome security key generation processes, and without compromising the level of security in the device. This makes the device ideal for a wide variety of electronic commerce and security applications.

In addition to the onboard computational circuitry used to run the sensor and assemble sufficient information to read the fingerprint, the invention may also involve a number of other computational functions to be performed by onboard electronic processing devices (microprocessors or combinatorial logic), such as RSA functions, secure key cryptography, public key cryptography (PKI), shared secrets, and other authentication functions. The microprocessor may be a specialized or dedicated microprocessor that is configured to perform particular tasks by executing machine-readable software code that defines the particular tasks. Often, the microprocessor may contain a core that is an ARM, MIPS, X86, 8051, MSP430, or other common microprocessor core. Some of these additional tasks may include accessing financial data or other data stored onboard memory (109) when the correct fingerprint has been provided, or accessing shared secrets (such as cryptographic shared secrets) onboard memory (109).

The smart card may or may not need a battery, wherein the smart card is configured to be powered when installed into a carrier. Alternatively, a battery may be included within the card, and may optionally be chargeable when installed within a carrier.

The microprocessor onboard either the card itself or the docking station may also be configured to operate and communicate with other devices such as direct memory access modules, memory storage devices, Internet related hardware, and other devices that relate to the transmission of data in accordance with the invention. The software code may be configured using software formats such as Java, C++, XML (Extensible Mark-up Language), AJAX, Perl, Ruby, assembly and other languages that may be used to define functions that relate to operations of devices required to carry out the functional operations related to the invention. The code may be written in different forms and styles, many of which are known to those skilled in the art. Different code formats, code configurations, styles and forms of software programs and other means of configuring code to define the operations of a microprocessor in accordance with the invention will not depart from the spirit and scope of the invention.

The smart card and the docking station may interact with other types of computers, such as networked computer servers. These devices normally include different types of memory, and the fingerprint data and shared secrets accessed by fingerprint data may be used in conjunction with these systems. When very fast operation, such as when scanning large numbers of different users simultaneously is desired, it may be advantageous for the networked computer servers to store corresponding fingerprint and shared secret data in cache memory. Cache memory devices are often included in such computers for use by the central processing unit as a very fast and convenient storage location for information that is frequently stored and retrieved.

Similarly, a persistent memory is also frequently used with such computers for maintaining information that is frequently retrieved by a central processing unit, but that is not often altered within the persistent memory, unlike the cache memory. Main memory is also usually included for storing and retrieving larger amounts of information such as data and software applications configured to perform functions according to the invention when executed by the central processing unit. These memory devices may be configured as random access memory (RAM), static random access memory (SRAM), dynamic random access memory (DRAM), flash memory, and other memory storage devices that may be accessed by a central processing unit to store and retrieve information. The invention is not limited to any particular type of memory device, or any commonly used protocol for storing and retrieving information to and from these memory devices respectively.

Although this embodiment is described and illustrated in the context of devices, systems and related methods of authenticating devices, the scope of the invention extends to other applications where such functions are useful. Furthermore, while the foregoing description has been with reference to particular embodiments of the invention, it will be appreciated that these are only illustrative of the invention and that changes may be made to those embodiments without departing from the principles of the invention.

The invention claimed is:

1. An electronic device, comprising:
  a card having an upper surface, a lower surface and side surfaces comprising:
    a secure memory containing sensitive information,
    a working memory, and
    a processor,
    wherein the card is dimensioned to be compatible with a size standard for identification cards;
  a fingerprint image sensor in the card configured to image a fingerprint through an imaging surface selected from one of the upper surface, the lower surface and the side surfaces of the surfaces of the card, the fingerprint image sensor comprising a linear capacitive sensor junction gap array comprising a plurality of excitation electrodes separated across a respective sensor junction gap from a sensing electrode, the electrodes formed on a substrate, and an integrated circuit in the card and configured to create a plurality of one dimensional images of a portion of a finger immediately over the junction gap when the finger is swiped over the junction gap array;
    wherein the fingerprint image sensor is in communication with the working memory to store the plurality of one dimensional images of a portion of the finger,
    and further wherein the processor is adapted to assemble the plurality of one dimensional images of a fingerprint into a fingerprint image;
  a fingerprint recognition memory containing at least one authorized fingerprint image,
    wherein the processor is configured to compare the assembled fingerprint image with the stored authorized fingerprint image, and
  at least one guide in the imaging area on the one of the upper surface, the lower surface and the side surfaces of the surfaces of the card configured to tactilely guide a user in swiping a finger across the imaging area of the fingerprint image sensor.

2. The device of claim 1, wherein said device derives power for running at least one of the fingerprint image sensor, the processor, the secure memory, the working memory and the fingerprint recognition memory from one of an external power source and an internal battery.

3. The device of claim 1, in which the fingerprint image sensor is a deep finger penetrating radiofrequency based sensor.

4. The device of claim 1, in which the fingerprint image sensor is bounded by the at least one guide, the at least one guide configured to direct the user to orient a finger at an angle more likely to produce adequate fingerprint recognition.

5. The device of claim 1, further comprising sensors to determine at least one of the directionality and angle of the finger swipe, and further comprising at least one of a visual output and an audio output to inform the user if the finger swipe generated an acceptable fingerprint read.

6. The device of claim 1, further comprising one of a power and a notification button to allow the user to switch the device to a state of higher power consumption prior to commencing a finger swipe.

7. The device of claim 1, wherein the device is one of a smart card and a credit card.

8. The device of claim 1, wherein if the fingerprint mosaic matches the stored authorized fingerprint the device is configured to at least one of modify at least some encoded bits to make the sensitive information available to an external device for at least one of reading and writing, and display an additional verification number on the surface of the card.

9. The device of claim 8, in which the verification number is a standard credit card verification number.

10. The device of claim 1, in which the device is read by a docking station that includes a device slot configured to receive and hold the device, and expose the fingerprint image sensor of the device to allow a user to swipe the fingerprint image sensor of the device.

11. The device of claim 10, in which the docking station contains a station processor configured to communicate with and read the device; and station memory configured to store fingerprint processing software code that,
when processed by the station processor, causes the station processor to perform fingerprint processing functions for validating a fingerprint received from a user.

12. The device of claim 10, wherein the docking station includes a slot that is configured to guide a user to swipe a finger across the imaging area located on the device, and wherein the docking station is configured with a guide for directing a user to swipe a finger in at least one of a linear manner and a linear horizontal manner, and in a direction normal with the fingerprint image sensor junction gap array.

13. The device of claim 10, wherein the docking station connects to an external computer by a link selected from the group consisting of a Universal Serial Bus (USB) link, an IEEE 1394 link, a serial link, a parallel link and an SPI link.

14. An electronic device comprising:
a smart card casing having an upper surface, a lower surface, and side surfaces comprising a magnetic strip configured to be read by a standard magnetic strip reader;
a fingerprint image sensor configured to image a fingerprint, the fingerprint image sensor comprising a linear capacitive sensor junction gap array comprising a plurality of excitation electrodes separated across a respective sensor junction gap from a sensing electrode, the electrodes formed on a substrate, and an integrated circuit in the card and configured to create a plurality of one dimensional images of a portion of a finger immediately over the junction gap array when the finger is swiped over the junction gap array;
a working memory to store the plurality of one dimensional images of a fingerprint;
a processor configured to process the plurality of one dimensional images of the fingerprint into a processed fingerprint image;
a fingerprint recognition memory configured to store at least one authorized fingerprint image;
a battery; and
a secure memory configured to store sensitive information, wherein if the processed fingerprint image matches the stored authorized fingerprint, the device is configured to at least one of: (a) modify at least some of the bits encoded on the magnetic strip to make the sensitive information available to external devices for at least one of reading and writing and (b) display an additional verification number on one of the surfaces of the card.

15. The smart card of claim 14, in which the dimensions of the smart card are compatible with a standard identification card size.

16. The smart card of claim 14, wherein the casing includes guides located about the fingerprint image sensor of the smart card and configured to allow a user to swipe the finger across the fingerprint image sensor in an ergonomic manner that guides the finger to an optimal angle for producing a fingerprint image.

17. The smart card of claim 14, in which the fingerprint image sensor is a deep finger penetrating radiofrequency based sensor.

18. The smart card of claim 14, further comprising:
sensors configured to determine at least one of the directionality and angle of the swipe of the finger; and
at least one of a visual output and an audio output to inform the user if the finger swipe generated an acceptable fingerprint image, wherein the visual output comprises an output on a visual display selected from the group consisting of an LED display, an LCD display, and an electronic paper display.

19. The smart card of claim 14, further comprising at least one of a power and a notification button and a sensor configured to allow the user to switch the smart card to a state of higher power consumption prior to commencing a finger swipe.

20. The smart card of claim 14, further comprising a visual display for outputting one of the verification number and an alphanumeric code.

21. The method of claim 14, in which the secure memory is made available to one of an external human and external device through a visual display located on the smart card.

22. An apparatus configured with an onboard fingerprint image sensor, comprising:
a casing having an upper surface, a lower surface, and side surfaces comprising a magnetic strip configured to be read by a standard magnetic strip reader;
a fingerprint image sensor configured to read a portion of a fingerprint from one of the surfaces of the casing, the fingerprint image sensor comprising a linear capacitive sensor junction gap array comprising a plurality of excitation electrodes separated across a respective sensor junction gap from a sensing electrode, the electrodes formed on a substrate, and an integrated circuit in the card and configured to create a plurality of one dimensional images of a portion of a finger immediately over the junction gap array when the finger is swiped over the junction gap array;
a fingerprint image memory configured to store a sensed fingerprint image;
a processor configured to process portions of a fingerprint into a fingerprint mosaic;
a fingerprint recognition memory configured to contain at least one authorized fingerprint image; and
a working memory configured to store sensitive information, wherein if the sensed fingerprint image matches the authorized fingerprint image, the apparatus configured to at least one of modify at least some of the bits encoded on the magnetic strip to make the sensitive information available to external devices and display an additional verification number on one of the surfaces of the card.

* * * * *